United States Patent
Ramakrishnan et al.

(10) Patent No.: US 11,366,692 B2
(45) Date of Patent: Jun. 21, 2022

(54) TASK EXECUTION BASED ON WHETHER TASK COMPLETION TIME EXCEEDS EXECUTION WINDOW OF DEVICE TO WHICH TASK HAS BEEN ASSIGNED

(71) Applicant: MICRO FOCUS LLC, Santa Clara, CA (US)

(72) Inventors: Krishna Mahadevan Ramakrishnan, Bangalore (IN); Venkatesh Ramteke, Bangalore (IN); Shiva Prakash Sm, Bangalore (IN)

(73) Assignee: MICRO FOCUS LLC, Santa Clara, CA (US)

( * ) Notice: Subject to any disclaimer, the term of this patent is extended or adjusted under 35 U.S.C. 154(b) by 223 days.

(21) Appl. No.: 16/663,896

(22) Filed: Oct. 25, 2019

(65) Prior Publication Data

US 2021/0124612 A1    Apr. 29, 2021

(51) Int. Cl.
*G06F 9/48* (2006.01)
*G06N 20/00* (2019.01)
*G06F 9/50* (2006.01)

(52) U.S. Cl.
CPC .......... *G06F 9/4887* (2013.01); *G06F 9/5038* (2013.01); *G06F 9/5072* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,473,956 | B2 * | 6/2013 | Kindel | G06F 9/4843 718/103 |
| 8,843,929 | B1 * | 9/2014 | Oppenheimer | G06F 9/5044 718/102 |
| 9,075,616 | B2 | 7/2015 | Duggal et al. | |
| 9,208,007 | B2 | 12/2015 | Harper et al. | |
| 10,936,359 | B2 * | 3/2021 | Yang | G06F 9/4887 |
| 11,184,236 | B2 * | 11/2021 | Guim Bernat | H04L 47/781 |
| 2012/0155704 | A1 * | 6/2012 | Williams | G01W 1/00 382/103 |
| 2018/0309629 | A1 | 10/2018 | Mohanram et al. | |

(Continued)

FOREIGN PATENT DOCUMENTS

KR    101323073    10/2013

OTHER PUBLICATIONS

Lanner, M., "Automate Running Tasks Using Amazon EC2 Systems Manager Maintenance Windows", AWS Management Tools Blog, May 31, 2017, <aws.amazon.com/blogs/mt/automate-running-tasks-using-amazon-ec2-systems-manager-maintenance-windows/>.

(Continued)

*Primary Examiner* — Eric C Wai

(57) ABSTRACT

Tasks of a group are respectively assigned to devices for execution. For each task, a completion time for a task is determined based on an associated cluster of the device to which the task has been assigned for execution is determined. If the completion time of a task exceeds an execution window of the device to which the task has been assigned, the task is removed from the group. The tasks remaining in the group are executed on the devices to which the tasks have been assigned for execution.

20 Claims, 8 Drawing Sheets

(56) References Cited

U.S. PATENT DOCUMENTS

2018/0367411 A1    12/2018  Narsude et al.
2020/0125400 A1*   4/2020   Venkataraman ....... G06N 20/00

OTHER PUBLICATIONS

Lerner, A. et al., "Intent-Based Networking" Cisco White Paper, Feb. 7, 2017, 11 pp.

"Manage Task Sequences to Automate Tasks", May 3, 2019, <docs.microsoft.corn/en-usiscan/osd/deploy-use/manage-task-sequences-to-automate-tasks>, 16 pp.

* cited by examiner

FIG 1

| | TASK TYPE | TASK PRIORITY | TASK START TIME | DEVICE | DEVICE PRIORITY | DEVICE EXECUTION WINDOW |
|---|---|---|---|---|---|---|
| 100A → | OS UPDATE | HIGH | TIME1 | DEVICE1 | HIGH | WINDOW1 |
| 100B → | PASSWORD RULE CHECK | HIGH | TIME2 | DEVICE1 | HIGH | WINDOW1 |
| 100C → | DISK SIZE CHECK | MEDIUM | TIME3 | DEVICE2 | HIGH | WINDOW2 |
| 100D → | DISK SIZE CHECK | MEDIUM | TIME4 | DEVICE3 | LOW | WINDOW3 |
| 100E → | OS UPDATE | LOW | TIME5 | DEVICE2 | HIGH | WINDOW2 |
| 100F → | DISK SIZE CHECK | LOW | TIME6 | DEVICE4 | MEDIUM | WINDOW4 |
| 100G → | PASSWORD RULE CHECK | LOW | TIME7 | DEVICE3 | LOW | WINDOW3 |

Columns: 102, 104, 105, 106, 108, 109
Groups: 110A, 110B, 110C
Rows grouped as 100.

US 11,366,692 B2

TASK EXECUTION BASED ON WHETHER TASK COMPLETION TIME EXCEEDS EXECUTION WINDOW OF DEVICE TO WHICH TASK HAS BEEN ASSIGNED

BACKGROUND

Enterprise and other types of computing environments, such as cloud computing environments, can include large numbers of diverse devices. Examples of such devices include computing devices like servers, networking devices such as routers, firewalls, and switches, and imaging devices like printers and scanners, among other types of devices. The devices of a computing environment can together support or host applications for execution on the behalf of the organization maintaining the environment, or on the behalf of its customers. Ensuring that the devices are properly running is important to ensure that the applications themselves are available as needed.

BRIEF DESCRIPTION OF THE DRAWINGS

FIG. 1 is a diagram of example tasks organized by priority over task groups and assigned for execution on devices of varying priority.

DETAILED DESCRIPTION

Figure 2:
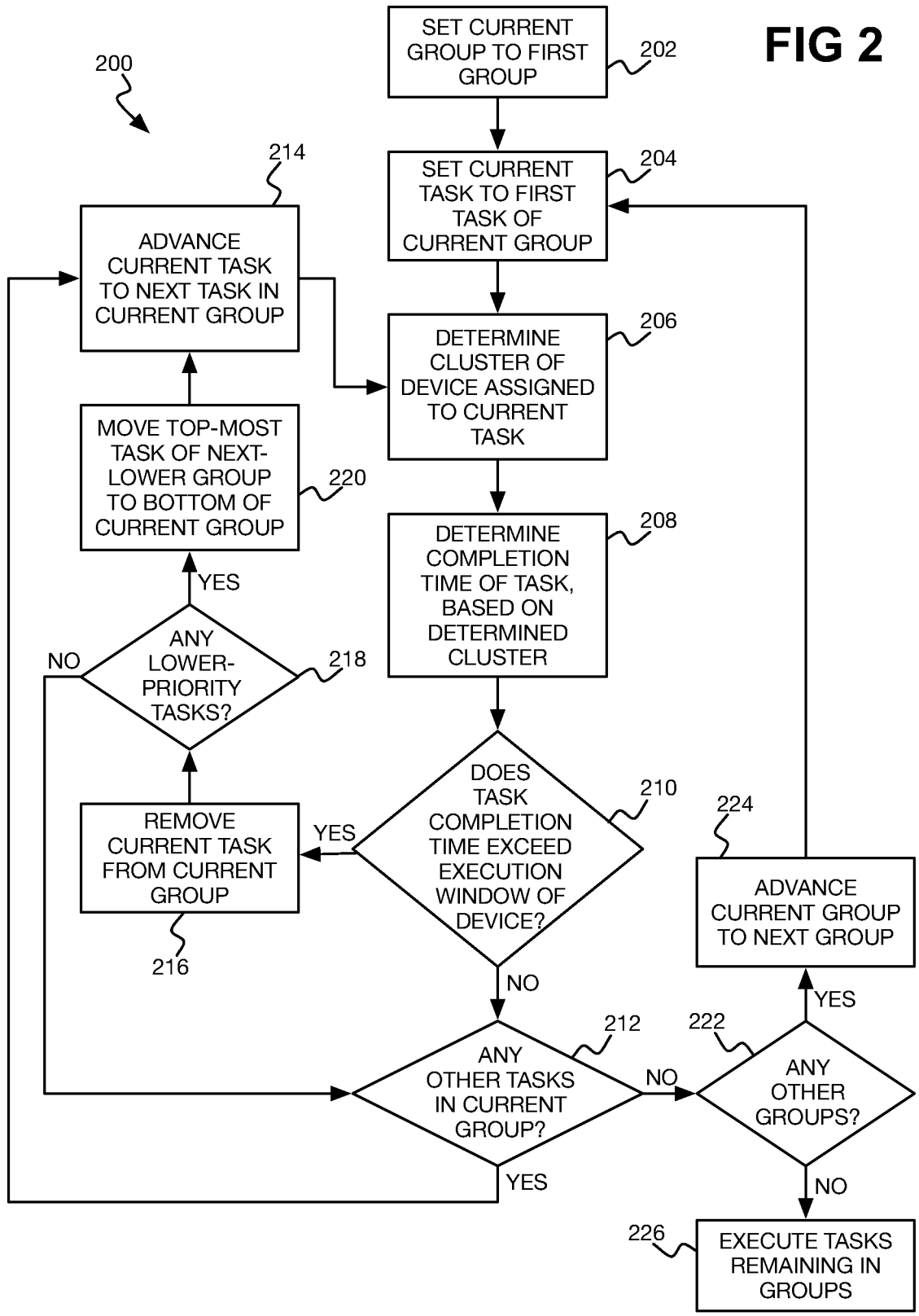
FIG. 2 is a flowchart of an example method for executing tasks, such as the tasks of FIG. 1.

As noted in the background, computing environments can include large numbers of different types of devices. To ensure that the devices are properly running, administrators may define tasks for execution on the devices. Such tasks can have varying priorities, which may indicate how critical they in ensuring that their assigned devices are effectively maintained, monitored, and updated as needed, so that the applications running on the devices remain available.

Devices may have update windows, which may more generally be referred to as execution windows, and in which the devices can have such maintenance, monitoring, and updating tasks executed. Administrators may schedule tasks so that their execution start on corresponding devices at start times within the devices' execution windows. However, it can be difficult for administrators to predict how long it will take for a given task to complete execution on a given device, which can result in task failure if the task is not finished when the device's execution window closes.

Furthermore, tasks of the same (as well as different) priority may be assigned for execution on devices that themselves have varying priorities. An application running on a higher priority device, for example, may be governed by a service level agreement (SLA) guaranteeing higher uptime or availability than an application running on a lower priority device. When scheduling tasks, administrators may be unaware of how critical the tasks' assigned devices are.

Techniques described herein ameliorate these and other issues. Devices on which tasks have been historically executed can be clustered over clusters by their device attributes. For each cluster of devices, the historical completion time of each task can be determined. This information can then be leveraged when determining whether tasks of varying priority, and assigned for execution on (the same or different) devices that themselves may have varying priorities, will finish in their assigned devices' allotted execution windows.

Furthermore, the tasks may be organized over groups corresponding to task priority. Each group of tasks can in turn be ordered by the priorities of the devices to which the tasks have been respectively assigned, to ensure that higher priority devices are updated, maintained, or monitored before lower priority devices to which tasks of the same priority have been assigned. The groups of tasks may be considered from the highest-priority group to the lowest-priority group, and the tasks of each group considered in the order of their assigned devices' priorities.

The predicted completion time of a task can be determined based on the associated cluster of the device to which the task has been assigned for execution. If this determined completion time exceeds the execution window of the assigned device, the task may be removed from its group and thus not executed, and further may be replaced with a task from a lower-priority group. Tasks remaining in the task groups can therefore be executed with high confidence that execution will succeed on the devices to which they have been assigned.

FIG. 1 shows example tasks 100, including tasks 100A, 1006, 100C, 100D, 100E, 100F, and 100G. While eight tasks 100 are depicted in FIG. 1, there can be more or fewer tasks 100. Each task 100 can have a task type 102, a task priority 104, and a specified task start time 105 on an assigned device 106. The assigned device 106 of each task 100 has a corresponding execution window 107 and a corresponding device priority 108.

A task 100 is generally considered a specific activity that is made up of ordered instructions for execution on the device 106 to which the task 100 has been assigned. An administrator or other user may create new tasks 100, or select existing tasks 100 for execution. The task type 102 of a task 100 specifies the actual activity or set of ordered instructions that are to be executed on the assigned device 106. The tasks 100 may be update, maintenance, or monitoring tasks that are periodically executed to ensure the proper running of their assigned devices 106.

The task priority 104 of a task 100 may be specified by an administrator or other user, or may be preset to a default priority for a particular task type 102 assigned for execution on a given device 106. The task priority 104 can differ for tasks 100 assigned to different devices 106. For example, both tasks 100A and 100E are of the task type "OS update," but the former task 100A assigned for execution on DEVICE1 has a medium task priority 104, whereas the latter task 100E assigned for execution on DEVICE2 has a low task priority 104.

The task start time 105 of a task 100 may be specified by an administrator or other user, or may similarly be preset to a default start time. The start time 105 of a task 100 may specify an absolute time on an absolute date, such as 9:55:00 AM on Sep. 5, 2019. As another example, the start time 105 may specify an absolute time on an absolute date, such as 8:00 AM on the first day of every month, the first Tuesday of every week, the last day of the third week of every other month, or the 15$^{th}$ day of every other month. The start time 105 may specify a time relative to the execution window 107 of the assigned device 106 of the task 100, such as at the beginning of the execution window 107, five minutes after the window 107 starts, and so on. There may be no specified start time 105, in which case the task 100 may begin execution on the assigned device 106 at any time within the execution window 107 of the device 106, for instance.

The device 106 to which a task 100 is assigned for execution may be specified by an administrator or other user, or may similarly be preset to a default device. The device 106 may be a computing device like a server. Other examples of devices 106 include networking devices like routers, firewalls, and switches, as well as imaging devices like printers and scanners.

Each device 106 has an associated device priority 108. The priority 108 of a device 106 is the same regardless of the tasks 100 assigned for execution on the same device 106. For example, DEVICE2 has a high priority 108, even though the tasks 100C and 100E assigned to this device 106 have differing task priorities 104 of medium and low, respectively.

The task priority 104 of a task 100 thus is different than the device priority 108 of the device 106 to which the task 100 has been assigned for execution. The priority 108 of a device 106 may indicate how critical the device 106 is in ensuring that applications hosted at least partially by the device 106 continue to run properly, and/or how critical these applications are (and thus how important the device 106 is). By comparison, the priority 104 of a task 100 may indicate how critical or important completion of the task 100 is in ensuring that the assigned device 106 remains up-to-date or otherwise continues to properly run and support its hosted applications.

The execution window 108 of a device 106 specifies the window of time in which the tasks 100 are permitted to be executed on the device 106. The window 108 may be specified during light periods of use of the applications running on the device 106, such as overnight or during weekends or holidays. The execution window 108 is thus a range of time, and can vary by device 106. An administrator or other user may specify the execution window 108 for a device 106, or the window 108 may be preset to a default window. Tasks 100 assigned to a device 100 that after beginning execution do not finish by the end of the window 108 may be prematurely terminated.

The tasks 100 are organized over task groups 110A, 1106, and 110C, which are collectively referred to as the tasks 100. While three groups 110 are depicted in FIG. 1, there may be more or fewer such tasks groups 110. The tasks 100 are organized over the task groups 110 by task priority 104, and the groups 110 are ordered from highest to lowest priority 104. The top-most group 110A includes the tasks 100A and 1006 having a high task priority 104; the middle group 110B include the tasks 100C and 100D having a medium task priority 104; and the bottom-most group 110C includes the tasks 100E, 100F, and 100G having a low task priority 104.

The tasks 100 within a task group 110 are ordered by the device priorities 108 of the devices 106 to which the tasks 100 have been assigned for execution. For example, the task 100C is the top-most task within the group 110B because the assigned device 106 of the task 100C has a higher device priority 108 than the assigned device 106 of the task 100D, which is the other task of the group 110B. The tasks 100 within a task group 110 that have assigned devices 106 with the same device priority 108 may be ordered relative to one another within the group 110 in a random manner, by device execution windows 108 of the devices 106, or in another manner. The tasks 100 within a task group 110 can be executed in sequence or in parallel.

FIG. 2 shows an example method 200 for executing tasks organized over groups by task priority, on devices to which the tasks have been assigned. A computing device can perform the method 200. For example, within an enterprise or other environment having a number of devices on which applications are hosted, the computing device may be one such device, or may be a management computing device for managing these devices. The method 200 may be implemented as program code stored on a non-transitory computer-readable data storage medium and executed by a processor of the computing device in question.

A current task group is set to the first group over which the tasks have been organized (202). The first group can be the highest priority task group, which is the group in which the tasks having highest task priority reside. This task group may also be referred to as the top-most group.

A current task is similarly set to the first task of the current group (204). A group of tasks may be organized by the device priorities of the devices to which the tasks have been assigned for execution, as noted above, from highest to lowest device priority. The first task of the current group can thus be a task assigned to a device having the highest device priority of any assigned device of a task within the current group. This task may also be referred to as the top-most task of the current group.

A cluster of the assigned device of the current task is determined (206). Devices over which tasks have been previously executed may be clustered over clusters by various device attributes, as is described in detail later in the detailed description. The cluster of the assigned device is determined as one of these clusters, based on the same device attributes. The completion time of the current task can then be determined, or predicted, based on this associated cluster of the device to which the task is assigned for execution (208), as is also described in detail later in the detailed description.

The current task has a task start time, as described above. The predicted completion time of the current task, together with the task's start time, can exceed the execution window of the device to which the task is assigned for execution. For example, if the execution window is for the four-hour time period between 1 AM and 5 AM, the task start time is 4 AM, and the predicted task completion time is three hours, execution of the task will likely not finish before the window ends. The task completion time, in other words, exceeds the execution window.

If the task completion time does not exceed the execution window of the assigned device (210), then the current task is permitted to remain within the current task group, which means that the current task will be executed on the device at its prescribed start time. If there are any other tasks in the current group that have not yet been analyzed as has been described (212), the current task advances to the next task in the current group (214), in the order in which the tasks are organized in the group. The method 200 is repeated for this new current task at part 208.

However, if the predicted task completion time exceeds the execution window of the device to which the current task is assigned (210), then the task is removed from the current group (216). This means that the current task will not be executed. There may be tasks with lower priority than the current task that has been removed from the current group. For example, for tasks organized over groups by task priority, if the current task group is not the bottom-most group, then there are one more task groups having tasks with lower priority than the current task.

If there are any lower-priority tasks (218), the top-most task of the next-lower task group can be moved to the bottom of the current task group (220). More generally, a task with lower priority than the current task, such as a task of a task group associated with lower task priority than the current task group, can be moved to the current group. The method 200 then proceeds to part 214 as has been described.

However, if there are no lower-priority tasks (218), then the method 200 proceeds to part 212. Once all the tasks in the current group have been analyzed to determine whether they should remain in the group (212), if there are other groups of tasks that have not yet been analyzed (222), the current group is advanced to the next group of tasks (224), in the order in which the task groups have been organized. The method 200 is repeated for this new current group at part 204.

In the example of FIG. 2, once all groups of tasks have been analyzed for removal as has been described (222), the tasks that remain can be executed (226). In another implementation, the tasks can be executed as the task groups are analyzed, as opposed to after all the groups have been analyzed. Task execution can mean that the computing device performing the method 200 schedules the task for execution at its assigned start time within the execution window of the device to which the task has been assigned. When the start time of a task has been reached, this or another computing device may initiate execution of the task on the assigned device.

Figure 3:
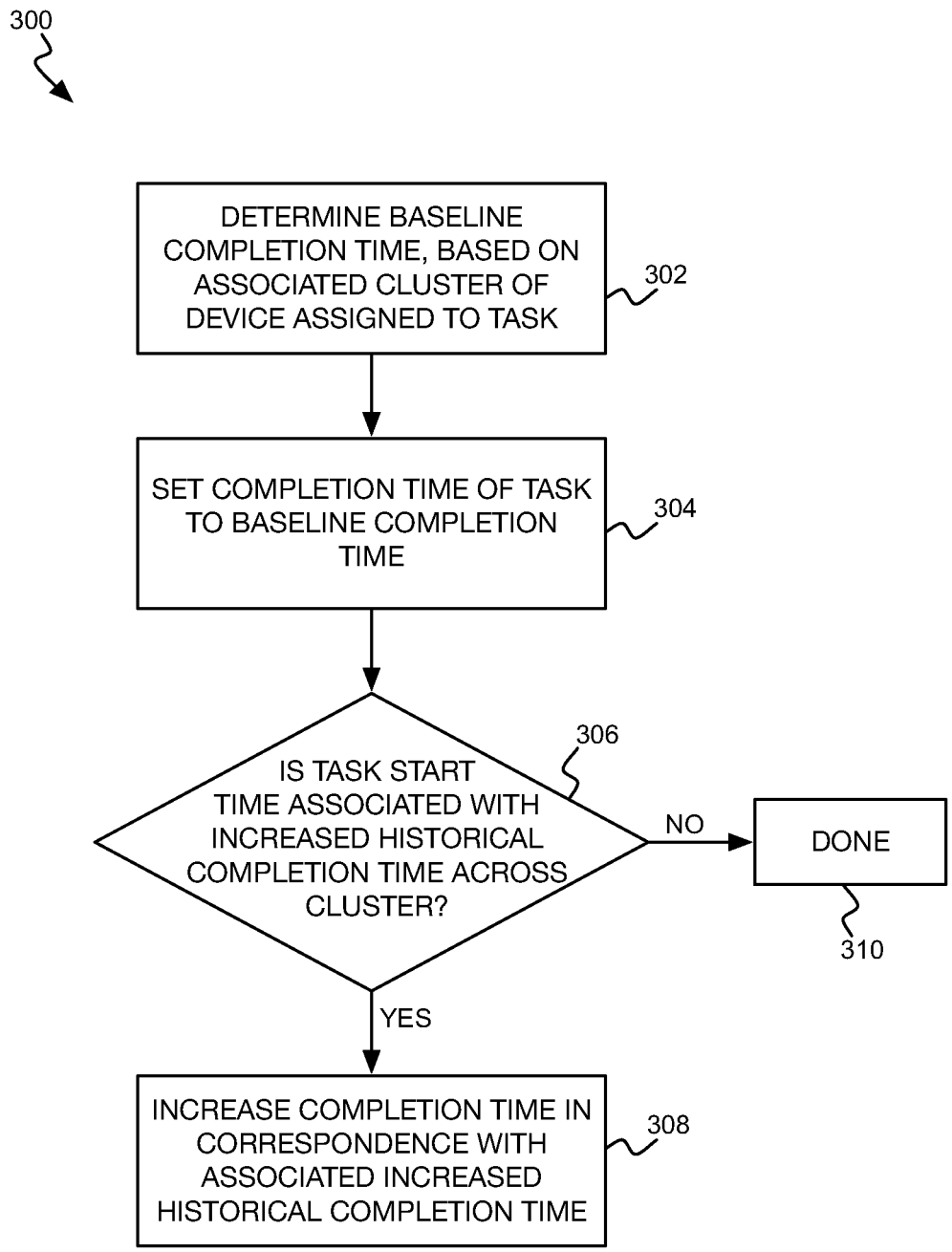
FIG. 3 is a flowchart of an example method for predicting task completion time, and which can be used in the method of FIG. 2 to determine whether tasks should be executed.

FIG. 3 shows an example method 300 for determining a predicted completion time for a task based on the associated cluster of the device to which the task has been assigned for execution. The method 300 can implement part 208 of the method 200. The same or different computing device that performs the method 200 can thus perform the method 300. Similarly, like the method 200, the method 300 can be implemented as program code stored on a non-transitory computer-readable data storage medium and executed by a processor of a computing device.

A baseline completion time of the task on the device to which the task has been assigned for execution is determined based on the associated cluster of this device (302). For each task type, the cluster has a corresponding baseline completion time, which can be the historical completion time of tasks for this task type over devices of this cluster. How the baseline completion time can be determined is described later in the detailed description. The predicted completion time of the task is initially set to the determined baseline completion time (304).

The task start time of the task may be associated with an increased historical completion time across the devices of the cluster. For example, in the past, some devices of the cluster may have executed tasks of the same task type in lengths of time that are considered unusually high, such as greater than a specified threshold. Such increased historical completion times may have occurred within particular temporal periods, or are otherwise associated with instances of historical task completion time that have such temporal periods.

The start time of the task may thus be associated with an increased historical completion time if it falls within any such temporal period. If so (306), then the initially set task completion time is increased in correspondence with an associated increased historical completion time (308), such as by a percentage corresponding to the increased historical completion time. How the increased historical completion time is determined, and how the instances of increased historical task completion time having associated temporal periods identified, are described later in the detailed description.

The start time of the task may not be associated with an increased historical completion time, however. In this case (306), the method 300 finishes without increasing the initially set task completion time (310). The completion time of the task is thus predicted in the method 300 as either the baseline completion time of the associated cluster of the device to which the task is assigned, or the baseline completion time increased in correspondence with an associated increased historical completion time.

Figure 4:
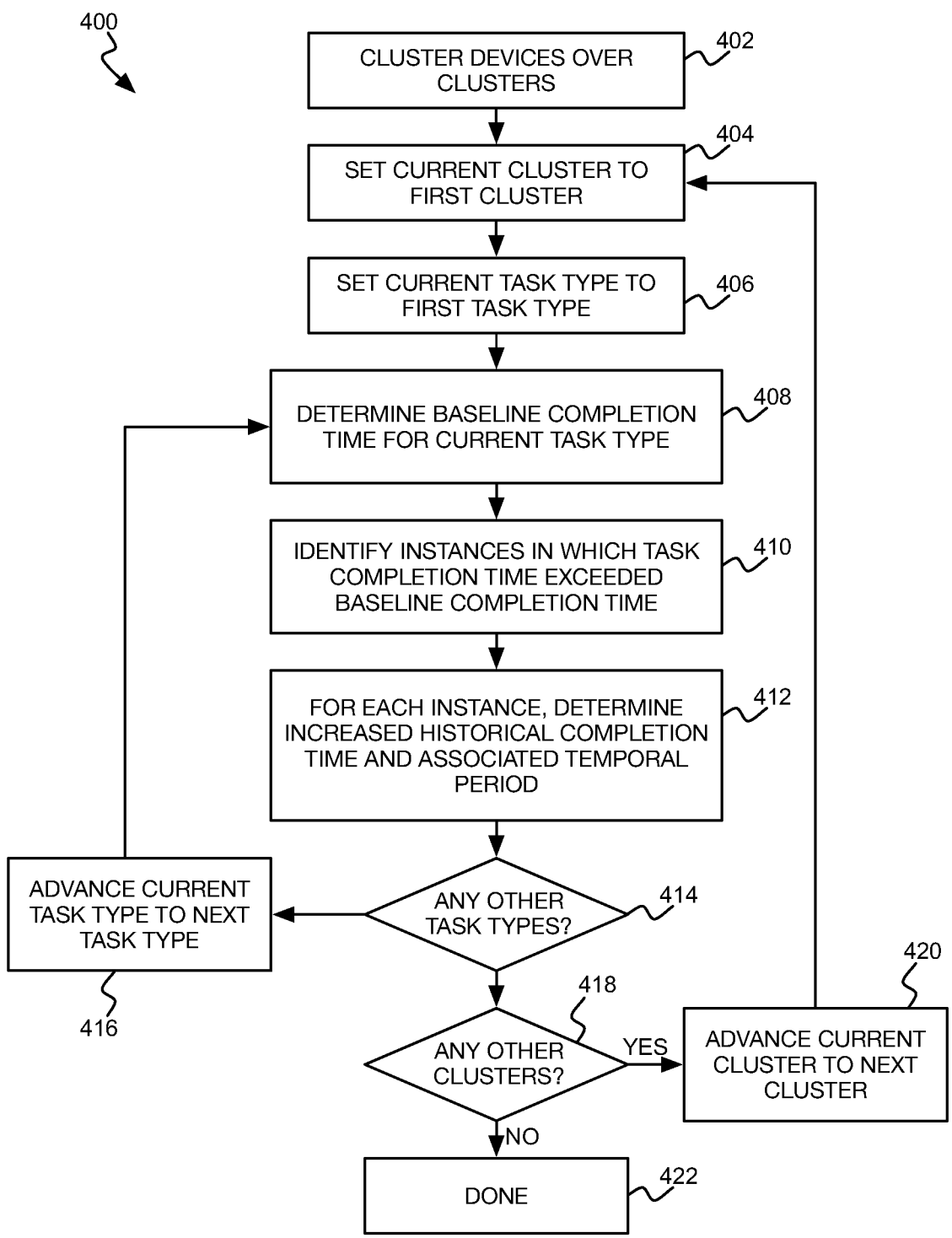
FIG. 4 is a flowchart of an example method for determining baseline completion times and temporal periods associated with instances of increased task completion times over clusters, on which basis the method of FIG. 3 can predict task completion time for a task on an assigned device.

FIG. 4 shows an example method 400 for determining baseline completion times and temporal periods associated with instances of increased task completion times for device clusters. This information can then be used in the method 300 to predict completion time of a task on an assigned device as has been described. The method 400, like the methods 200 and 300, can be implemented as program code stored on a non-transitory computer-readable data storage medium and executed by a processor of a computing device, such as the computing device that may then perform the methods 200 and/or 300.

Tasks of different task types may have been historically executed on devices of an enterprise or other environment. The devices each have attributes. Such device attributes can include processor-oriented attributes, such as the number of processors, the number of cores of each processor, the type, kind, model, or manufacturer of each processor, the operating frequency of each processor, and so on. Such device attributes can include memory-type attributes, such as the amount of memory, the type of memory, the operating frequency of the memory, and so on. The device attributes can include other types of attributes as well, including network-type attributes, and operating system-type attributes.

The device attributes are static attributes that do not vary over time. For instance, the device attributes do not include processing load, memory load, or network utilization, because such attributes vary as devices execute tasks. Further, if a device attribute of a device changes, the device in effect becomes a new device. For example, if the amount of memory of a device is increased, the device is no longer a device having the original memory amount but rather becomes one having the new memory amount.

The devices are clustered over clusters by the attributes (402). The devices may be clustered using any of a number of different techniques. As an example, the clustering technique may be a machine learning clustering technique, such as a K-means machine learning clustering technique.

A current cluster is set to a first cluster of the device clusters (404). The device clusters may be unordered. A current task type is set to a first task type (406). There are a number of task types, which may be unordered. Each device of each cluster may have historically executed tasks of each task type. More generally, each device of each cluster has historically executed one or more tasks of one or more task types.

A baseline completion time is determined for the current task type (408). The baseline completion time is determined from the historical completion times of tasks across the devices of the current cluster. For example, the baseline completion time may be determined as the average or median completion time of the tasks of the current task type that have been previously executed on the devices of the current cluster.

Instances in which the task completion time exceeded the baseline completion time are identified (410). Each such instance corresponds to the historical execution of a task of the current task type on a device of the current cluster, in a completion time greater than the baseline completion time for the current task type on the current cluster, by more than a threshold. The threshold may be specified as a percentage, as a number of standard deviations, or in another manner.

For each instance, an increased historical completion time and an associated temporal period are determined (412). The increased historical completion time may be expressed as a percentage. For example, if an instance corresponds to the historical execution of a task in completion time Y, and the baseline completion time for the task's type on the current cluster is X, the increased historical completion time may be specified as (Y–X)/X. The temporal period of an instance corresponds to the period of time in which the task associated with the instance was executed.

If there are other task types that have not yet been analyzed for the current cluster (414), then the current task type is advanced to the next task type (416), and the method 400 is repeated at part 408. Once all the task types have been so analyzed for the current cluster (414), if there are any other clusters for which the task types have not yet been analyzed (418), then the current cluster is advanced to the next cluster (420), and the method 400 is repeated at part 404. Once all the task types have been analyzed for all the clusters (418), the method 400 is finished (422). The method 400 may be periodically repeated as tasks are executed on the same or new devices.

Figure 5:
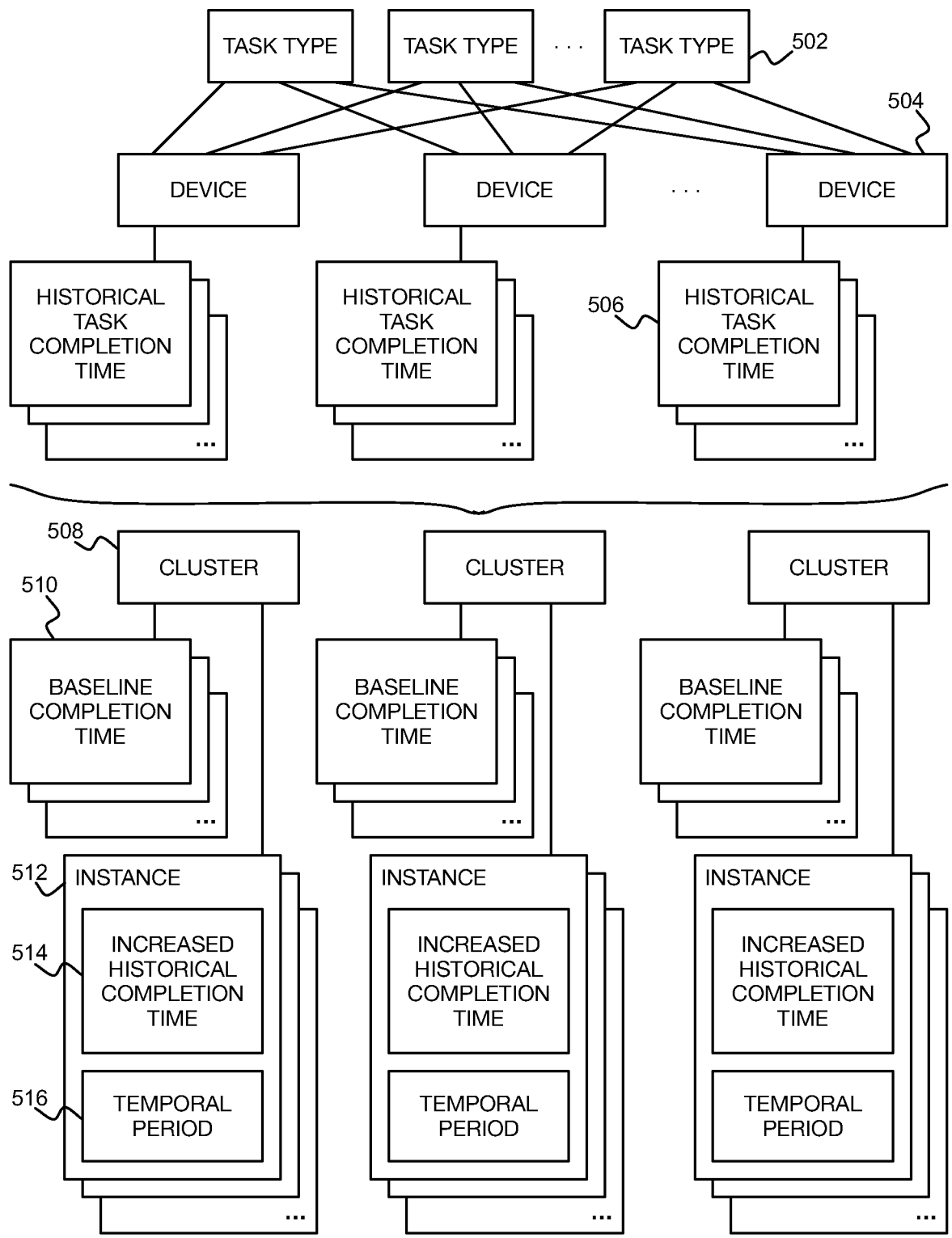
FIG. 5 is a diagram of an example performance of the method of FIG. 4.

FIG. 5 graphically summarizes example performance of the method 400. Tasks of varying task types 502 are executed over devices 504, resulting in task completion times 506 of the tasks for each device 504. The devices 504 are clustered over clusters 508. For each cluster 508, baseline task completion times 510 are determined for the task types 502, as are instances 512 of increased historical completion times 514 and associated temporal periods 516. The baseline completion times 510 are determined on a per-task type and per-cluster basis, as are the instances 512. The increased historical completion times 514 and their associated temporal periods 516 can be determined on a per-instance, per-task type, and per cluster basis.

Figure 6:
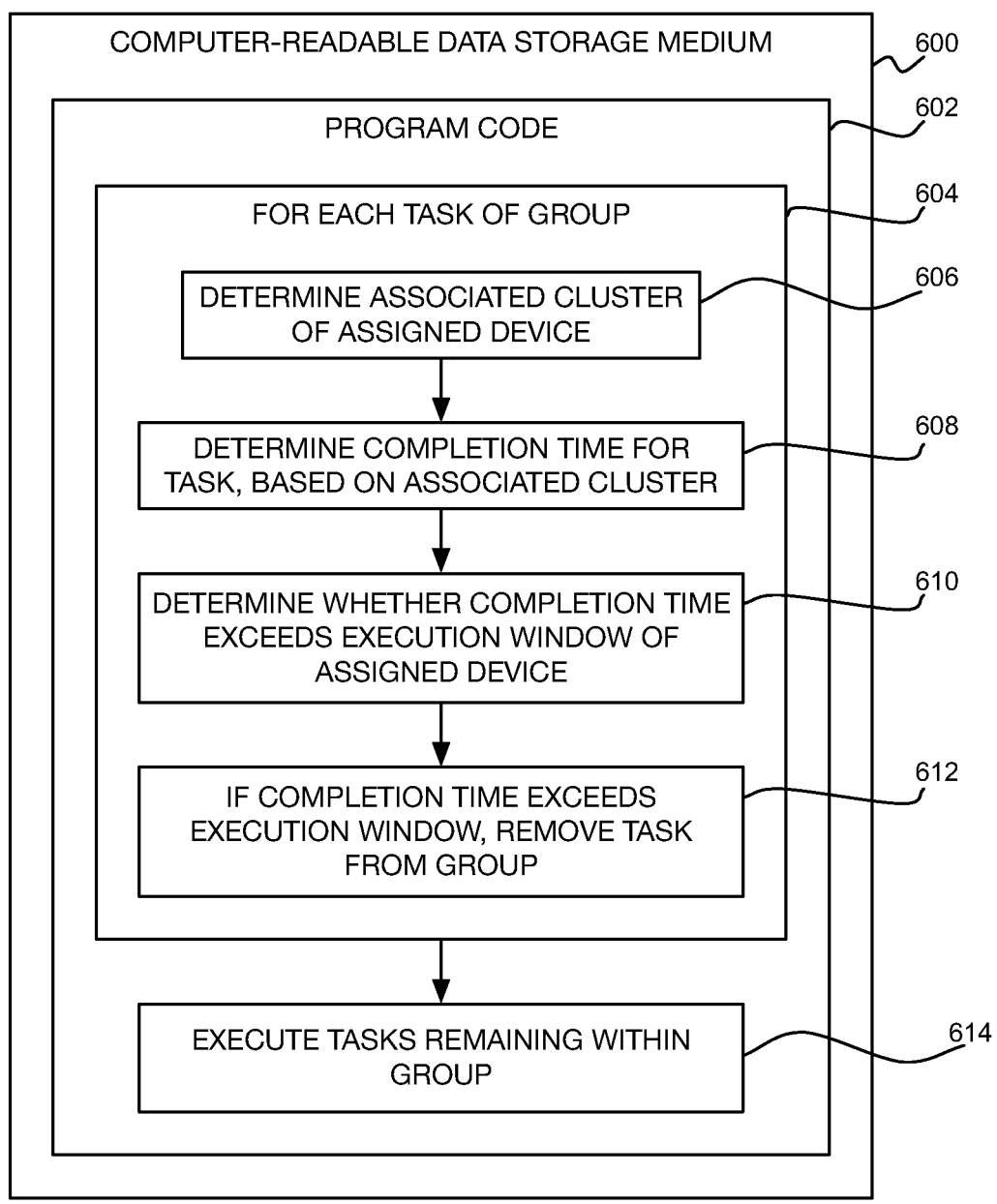
FIG. 6 is a diagram of an example computer-readable data storage medium.

FIG. 6 shows an example non-transitory computer-readable data storage medium 600. The computer-readable data storage medium 600 stores program code 602. The program code 602 is executable by a processor to perform processing.

The processing can include the following for each task of a group of tasks respectively assigned to devices for execution (604). An associated cluster of the device to which the task has been assigned for execution is determined (606). A completion time for the task is determined based on the associated cluster of the assigned device (608).

Whether the completion time exceeds an execution window of the assigned device is also determined (610). If the completion time exceeds the execution window, the task is removed from the group (612). The processing can further include then executing the tasks remaining in the group, on the devices to which the tasks have been assigned for execution (614).

Figure 7:
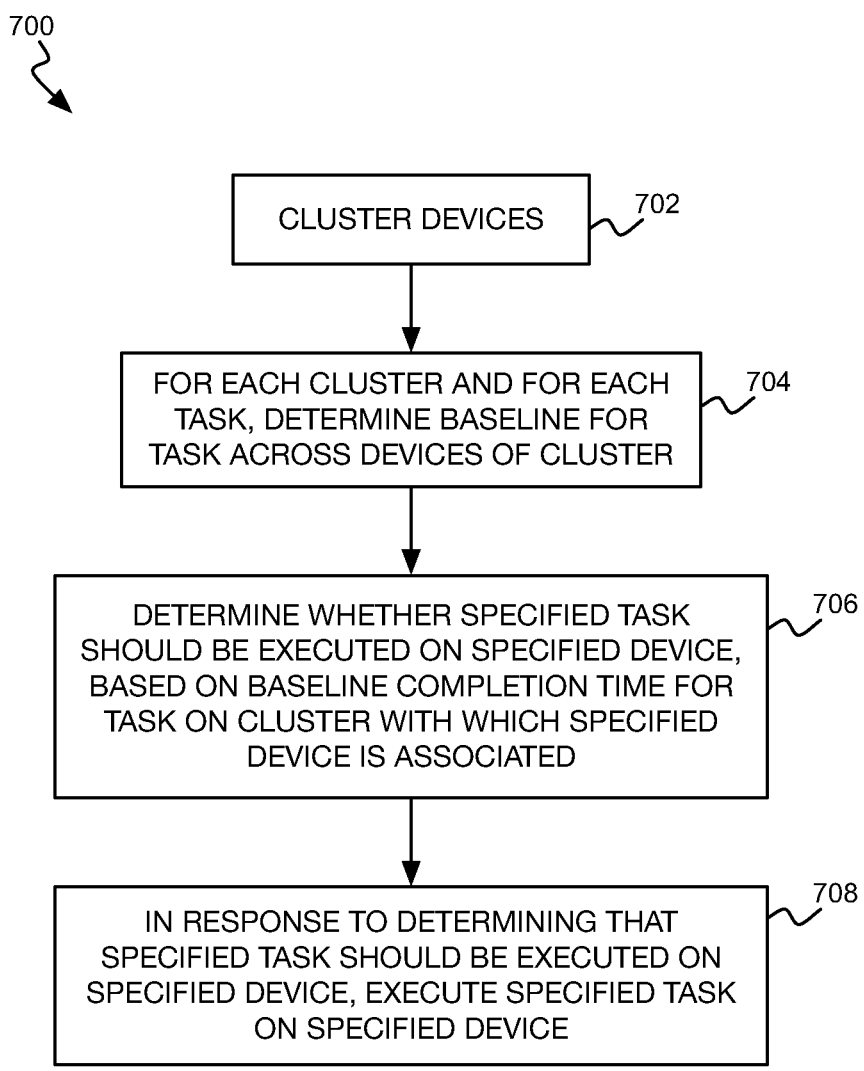
FIG. 7 is flowchart of an example method.

FIG. 7 shows an example method 700. The method 700 includes clustering devices over clusters by device attributes (702). For each cluster and for each of a number of task types, the method 700 includes determining a baseline completion time for the task type on the cluster from historical execution of tasks of the task type across the devices of the cluster (704).

The method 700 includes determining whether a specified task should be executed on a specified device to which the specified task has been assigned (706). This determination is made based on the baseline completion time for the task type of the specified task on the cluster with which the specified device is associated. The method 700 includes, in response to determining that the specified task should be executed, executing the specified task on the specified device (708).

Figure 8:
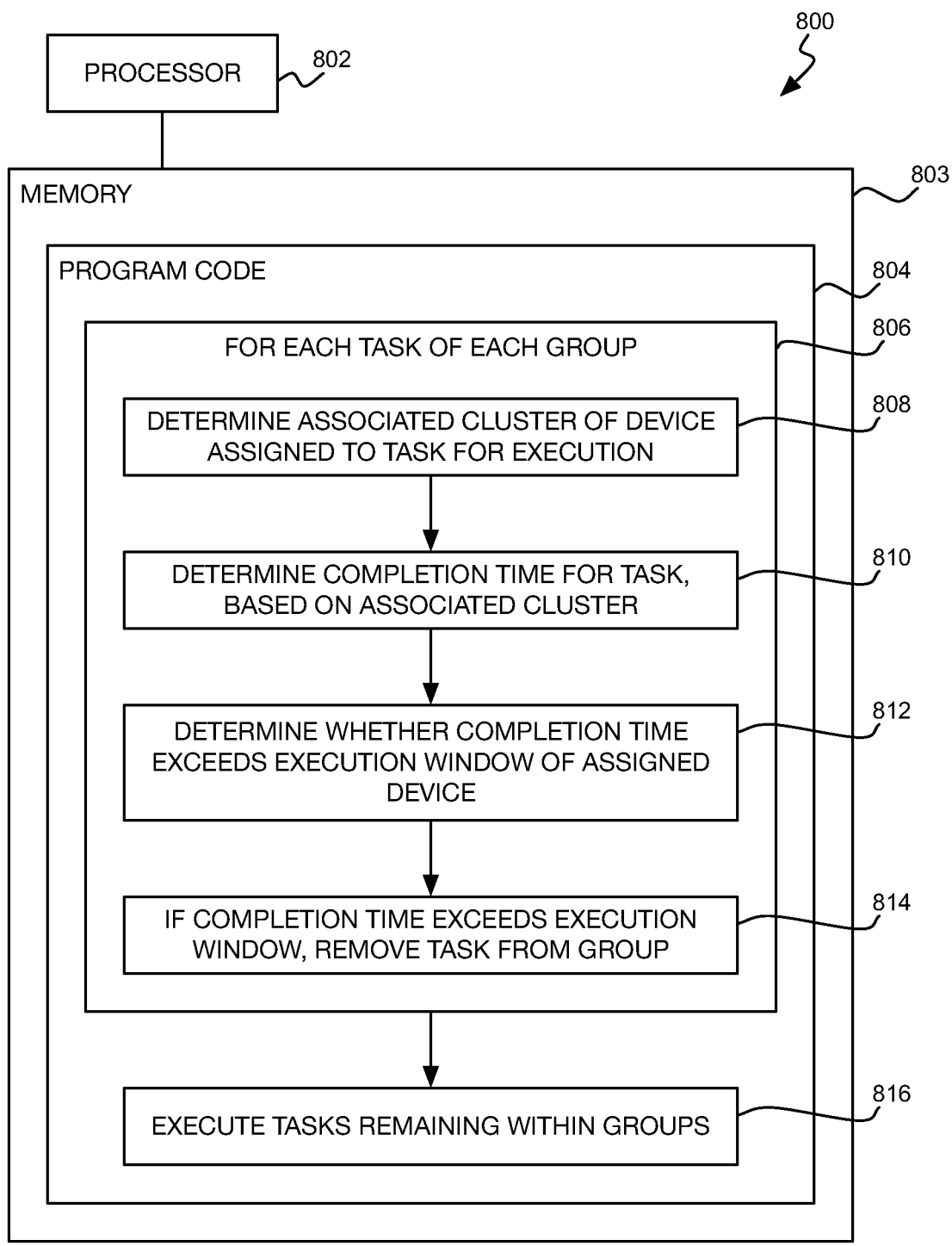
FIG. 8 is a diagram of an example system.

FIG. 8 shows an example system 800. The system 800 includes a processor 802 and memory 803 storing program code 804. The processor executes the program code 804 to perform the following for each task of a number of groups of tasks, in order from a highest priority group to a lowest priority group (806).

An associated cluster of a device to which the task has been assigned for execution is determined (808). A completion time for the task is determined, based on the associated cluster of the assigned device (810), as is whether the completion time exceeds an execution window of the device (812). If the completion time exceeds the execution window, the task is removed from the group (814). The tasks remaining in the groups are then executed on their assigned devices (816).

In the techniques that have been described herein, the completion time of a task on an assigned device can be predicted from historical completion times of tasks of the same type over devices of a cluster to which the assigned device is associated. Therefore, whether the task is likely to finish execution within the execution window of the assigned device can be assessed with high confidence. The predicted completion time can further take into account whether the start time of the task corresponds to a temporal period associated with increased historical task completion time. Both task priority and device priority can be taken into account when ordering the tasks, so that higher priority tasks assigned to higher priority devices have their execution prioritized over other tasks.

We claim:

1. A non-transitory computer-readable data storage medium storing program code executable by a processor to perform processing comprising:
   for each of a group of tasks respectively assigned to a plurality of devices for execution such that each task is assigned to a respective device for execution:
      determining an associated cluster of the device to which the task has been assigned for execution, the associated cluster including different devices on which the task has been historically executed and that have been clustered into the associated cluster according to a device attribute;
      determining a completion time for the task, based on the associated cluster of the device to which the task has been assigned for execution;
      determining whether the completion time exceeds an execution window of the device to which the task has been assigned for execution;
      in response to determining that the completion time exceeds the execution window, removing the task from the group; and
   executing the tasks remaining in the group on the devices to which the tasks have been assigned for execution.

2. The non-transitory computer-readable data storage medium of claim 1, wherein determining the completion time for the task, based on the associated cluster of the device to which the task has been assigned for execution, comprises:
  determining a baseline completion time for the task, the baseline completion time corresponding to a historical completion time of the task across the cluster; and
  setting the completion time for the task to the baseline completion time.

3. The non-transitory computer-readable data storage medium of claim 2, wherein determining the completion time for the task, based on the associated cluster of the device to which the task has been assigned for execution, further comprises:
  determining whether a task start time of the task occurs within a temporal period associated with an increased historical completion time of the task across the cluster; and
  in response to determining that the task start time occurs within the temporal period, increasing the completion time for the task in correspondence with the increased historical completion time.

4. The non-transitory computer-readable data storage medium of claim 1, wherein the tasks of the group have a priority, and the processing further comprises:
  in response to determining that the completion time exceeds the execution window, adding a lower-priority task to the group.

5. The non-transitory computer-readable data storage medium of claim 1, wherein the tasks of the group have a task priority, and the device to which each task is assigned for execution has a device priority,
  and wherein the tasks are ordered within the group by the device priorities of the devices to which the tasks have been assigned for execution.

6. The non-transitory computer-readable data storage medium of claim 5, wherein the group of tasks is a first group of first tasks having a first priority, and the processing further comprises:
  in response to determining that the completion time exceeds the execution window, moving a second task from a second group of second tasks to a bottom of the first group,
  wherein the second group of second tasks are respectively assigned to the devices for execution and have a second priority lower than the first priority, the second tasks ordered within the second group by the device priorities of the devices to which the second tasks have been assigned for execution.

7. The non-transitory computer-readable data storage medium of claim 1, wherein the tasks are periodically performed to maintain, monitor, and update the devices, the devices being networking devices.

8. A method comprising:
  clustering a plurality of devices over a plurality of clusters by device attributes;
  for each cluster and for each of a plurality of task types, determining a baseline completion time for the task type on the cluster from historical execution of tasks of the task type across the devices of the cluster;
  determining whether a specified task should be executed on a specified device to which the specified task has been assigned, based on the baseline completion time for a task type of the specified task on the cluster with which the specified device is associated; and
  in response to determining that the specified task should be executed, executing the specified task on the specified device.

9. The method of claim 8, further comprising, for each cluster and for each of a plurality of task types:
  identifying a plurality of instances in which completion time of the tasks of the task type across the devices of the cluster was greater than the baseline completion time; and
  for each instance, determining an increased historical completion time and an associated temporal period.

10. The method of claim 9, wherein determining whether the specified task should be executed on the specified device is further based on whether a task start time of the task occurs within the temporal period of any instance for the task type of the specified task and for the cluster with which the specified device is associated.

11. The method of claim 8, wherein the devices are clustered over the clusters using K-means machine learning.

12. The method of claim 8, wherein the specified task is part of a group of specified tasks having a priority, and the method further comprises:
  in response to determining that the specified task is not to be executed, removing the specified task from the group.

13. The method of claim 12, the method further comprising:
  in response to determining that the specified task is not to be executed, adding a different task having a lower priority to the group.

14. The method of claim 8, wherein the clusters and the baseline completion times are periodically updated as the tasks are executed over the devices of the clusters.

15. A system comprising:
  a memory storing program code; and
  a processor to execute the program code to, for each of a plurality of groups of tasks, in order from a highest priority group to a lowest priority group:
    for each task:
      determine an associated cluster of a device to which the task has been assigned for execution, the associated cluster including different devices on which the task has been historically executed and that have been clustered into the associated cluster according to a device attribute;
      determine a completion time for the task, based on the associated cluster of the device to which the task has been assigned for execution;
      determine whether the completion time exceeds an execution window of the device to which the task has been assigned for execution;
      in response to determining that the completion time exceeds the execution window, remove the task from the group; and
    execute the tasks remaining in the group on the devices to which the tasks have been assigned for execution.

16. The system of claim 15, wherein the processor is to determine the completion time for the task, based on the associated cluster of the device to which the task has been assigned for execution, by:
  determining a baseline completion time for the task, the baseline completion time corresponding to a historical completion time of the task across the cluster; and
  setting the completion time for the task to the baseline completion time.

17. The system of claim 16, wherein the processor is to determine the completion time for the task, based on the associated cluster of the device to which the task has been assigned for execution, by further:

determining whether a task start time of the task occurs is associated with an increased historical completion time of the task across the cluster; and in response to determining that the task start time is associated with the increased historical completion time, increasing the completion time for the task in correspondence with the increased historical completion time.

18. The system of claim 15, wherein the tasks of the groups have a task priority, with the tasks of the highest priority group having a highest task priority and the tasks of the lowest priority group having a lowest task priority, and wherein the processor is further to:

in response to determining that the completion time exceeds the execution window, adding a task from a next-lower priority group to the group.

19. The system of claim 18, wherein the device to which each task is assigned for execution has a device priority, and wherein the tasks of each group are ordered within the group by the device priorities of the devices to which the tasks have been assigned for execution.

20. The system of claim 19, wherein the task added from the next-lower priority group to the group is a top-most task within the next-lower priority group, and is added to a bottom of the group.

* * * * *